United States Patent [19]

Braeger

[11] 4,336,634
[45] Jun. 29, 1982

[54] APPARATUS FOR THE SEVERING OF THE FILLETS FROM THE SKELETON OF FISH

[75] Inventor: Horst Braeger, Lübeck, Fed. Rep. of Germany

[73] Assignee: Nordischer Maschinenbau Rud. GmbH Co. KG, Lübeck, Fed. Rep. of Germany

[21] Appl. No.: 145,664

[22] Filed: May 1, 1980

[30] Foreign Application Priority Data

Nov. 15, 1979 [DE] Fed. Rep. of Germany ....... 2946042

[51] Int. Cl.³ ............................................. A22C 25/16
[52] U.S. Cl. ...................................................... 17/57
[58] Field of Search ............................................ 17/57

[56] References Cited

U.S. PATENT DOCUMENTS

| | | | |
|---|---|---|---|
| 1,709,362 | 4/1929 | Meissner et al. | 17/57 |
| 3,964,132 | 6/1976 | Backhaus et al. | 17/57 |
| 4,056,866 | 11/1977 | Wenzel | 17/57 |
| 4,084,294 | 4/1978 | Dohrendorf | 17/57 X |
| 4,236,275 | 12/1980 | Westerdahl | 17/57 X |

FOREIGN PATENT DOCUMENTS 1454095 7/1972 Fed. Rep. of Germany .......... 17/57
142419 6/1980 German Democratic Rep. .... 17/57

Primary Examiner—Willie G. Abercrombie
Attorney, Agent, or Firm—Edward F. Levy

[57] ABSTRACT

In a fish filleting machine with one pair each of circular belly filleting knives, back filleting knives and severing knives as well as belly and back guides arranged on the one hand between the former and on the other hand between the latter, the fish is saddled up tail forward on a push saddle. A scraper tool is disposed beside the belly guides downstream of the belly filleting knives and upstream of the plane of the severing knives, both halves of which scraper tool consist of a respective wedge-shaped scraper knife, the cutting edges of which are associated with a bulge-shaped backing support. The scraper tool is controllable in its height position. In that case, the scraper tool assumes a lowered, i.e. basic setting while the tail part of the fish is guided past. On arrival of the abdominal cavity end, it is driven into a raised setting so that the scraper knife after penetration of the uncut flesh band disposed laterally beside the backbone severs the fillets above the vertebral projections and ribs. The complete severing of the fillets takes place by the concluding severing cuts.

5 Claims, 8 Drawing Figures

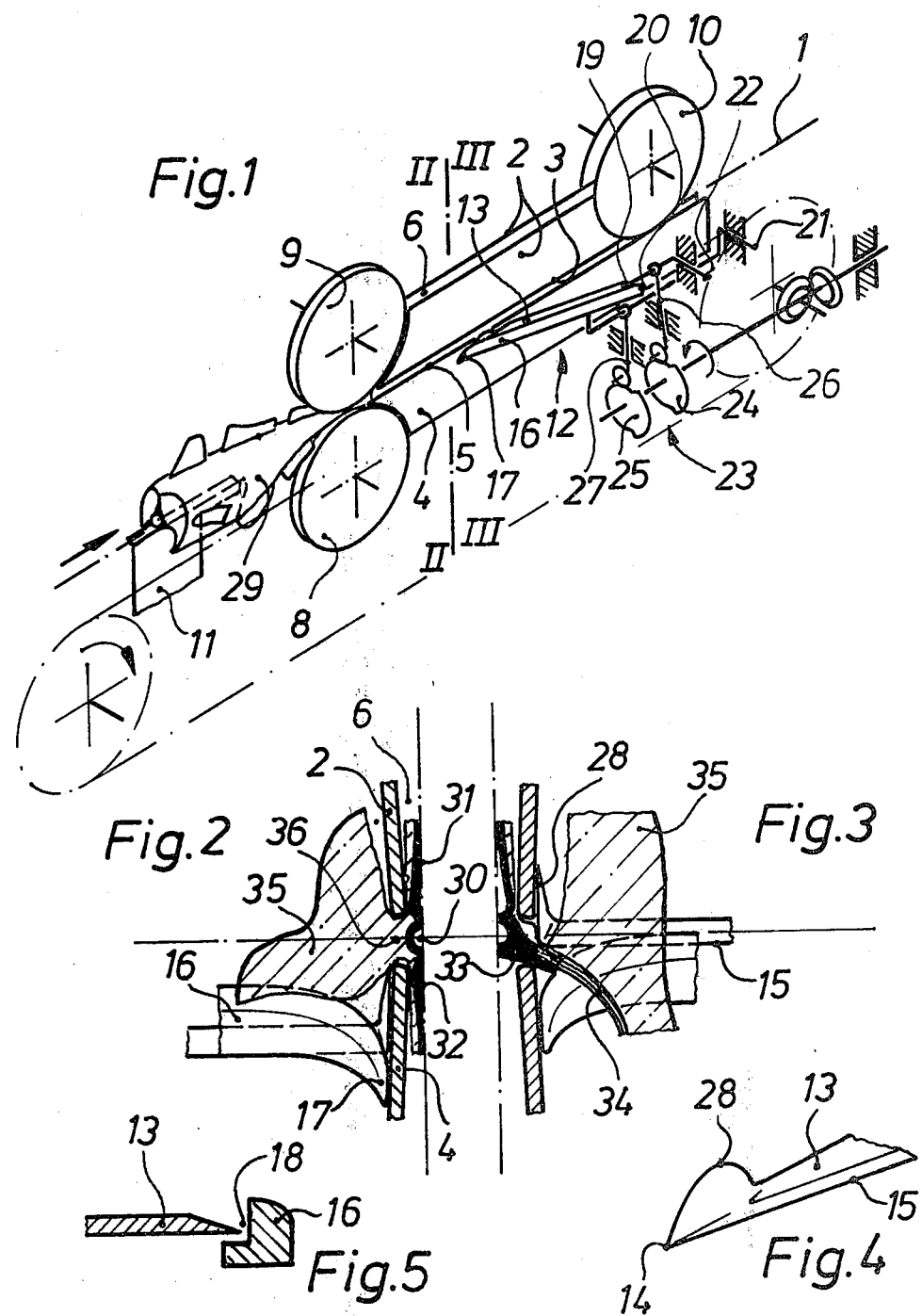

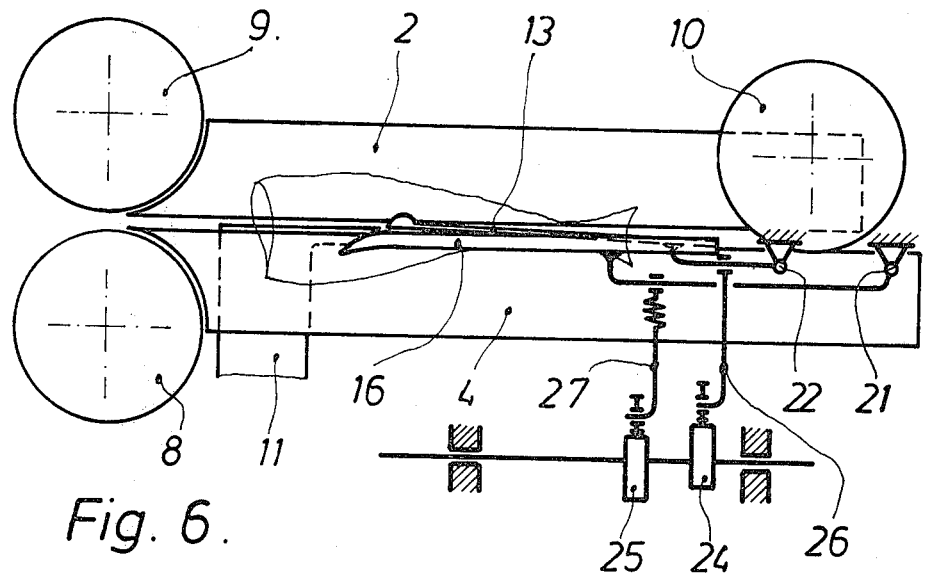
Fig. 6.
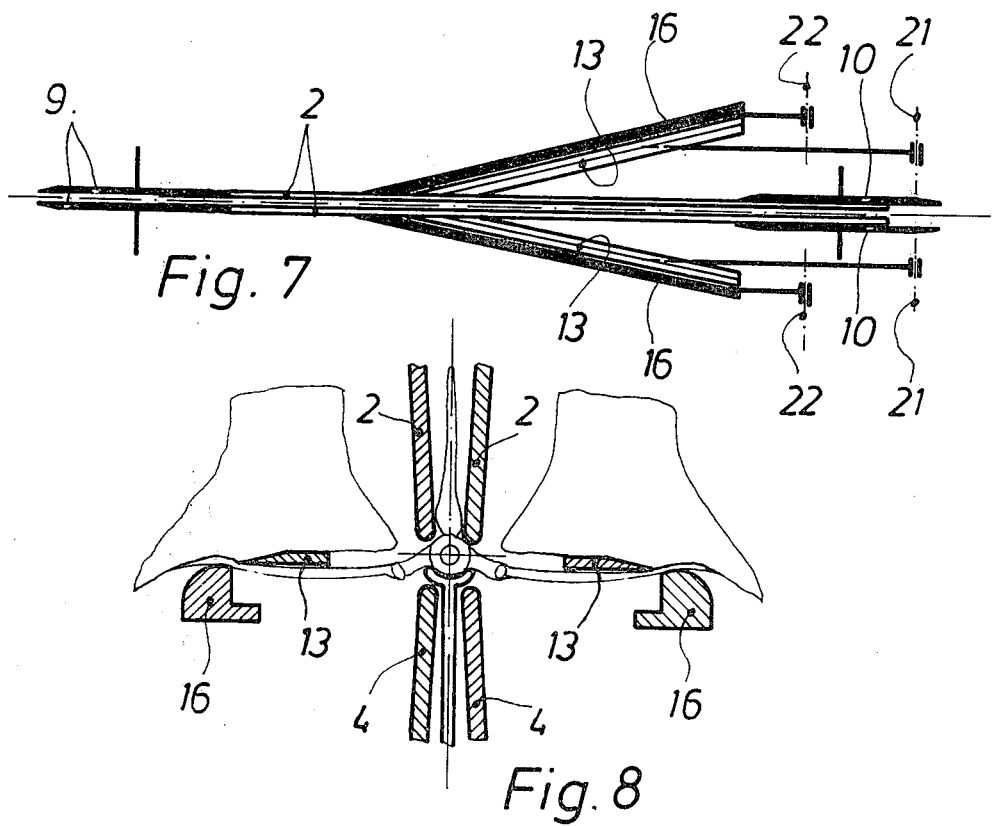
Fig. 7
Fig. 8

APPARATUS FOR THE SEVERING OF THE FILLETS FROM THE SKELETON OF FISH

BACKGROUND OF THE INVENTION

1. Field of the Invention

The invention concerns an apparatus for the severing of the fillets from the fishbone skeleton of fish conveyed tail forwards in a conveying direction, comprising belly and back filleting knives and severing knives, all of these arranged essentially in pairs, tools for cutting the ribs free arranged essentially in pairs between the belly and the back filleting knives on the one hand and the severing knives on the other hand as well as respective belly and back guides arranged in pairs and extending in the planes of the belly and back filleting knives and downstream of these in the conveying direction.

2. Description of Prior Art

The filleting of fish usually takes place through filleting cuts conducted over the entire fish at both sides of the belly and back spokes and subsequent severing of the fillets from the ribs and vertebral appendages through rib cuts conducted above the same as far as the plane of the back filleting cuts. In that case, the rib knife is activated on arrival of the abdominal cavity end through freeing of the effective cutting edges. The complete detaching of the fillets takes place finally through a pair of severing cuts, which are conducted to both sides of the backbone and by means of which the flesh bands remaining between the belly and back filleting cuts are severed.

Such a filleted apparatus is for example known from the DE-PS 14 54 087 which also shows the cut-backing supports holding the cutting edges of the rib knives concealed until the arrival of the abdominal cavity end and arranged to be deflected then. In that case, belly and back guides arranged directly downstream of the belly and back filleting knives and in their planes take over the guiding of the fish, in that these enter into the filleting cuts each reaching the backbone. In consequence of the rigid arrangement of the rib cutting tool in a plane touching the lower edges of the back guides, the tail part, not to be processed by this tool, of the fish with its belly-sided fillets cut free by the belly filleting knives is guided away over the rib knives. In order to give the tail part the deviatability in height necessary for this action, the back guides are at first held raised and are lowered only with the freeing of the cutting blades of the rib knives on arrival of the abdominal cavity end.

Due to the circular shape of the knives, there results the disadvantage in such a filleting device that there is a measurable loss of yield at the abdominal cavity end by the necessity of the cutting edges of the rib knives having to be freed already when the first rib arches reach the preceding parts of the cutting edges. Beyond that, a rough cutting surface arises in this region due to the motion of the fish, taking place during the lowering of the back guides, transversely to the knives during the cutting process, which is disadvantageous for optical reasons as well as also from a bacteriological point of view.

To improve the yield in fillet flesh, scraper tools as disclosed in the DE-PS 13 54 089 have come into use as rib cutting tools. The improvement in yield in that case rests on the fact that the scraper knives scrape by their cutting edges directly over the surface of the ribs or vertebral appendages so that no fillet flesh remains on these. With the use of such scraper tools, a pre-disposition of the severing cut for the severing of the flesh bands remaining at the sides of the backbone after the belly and back filleting cuts is required before the rib cut, because the scraper knives lying rigidly in the plane of the lower edges of the back guides in consequence of their ploughlike effect push the fillets away from the ribs or vertebral appendages. For this, the fillets must however be completely detached in the tail region.

In such a cutting sequence, it is apparent that due to the upsetting forces acting on the fillets in this region, irregularities in the cut conduction arise, which impair the filleting result qualitatively and with respect to yield. Beyond that, it is not possible to ensure that the severed fillets are always delivered in unambiguous position, for example planarly lying on the skin side. This is however a prerequisite for a problem-free automatic further processing which has the object for example of skinning.

OBJECT OF THE INVENTION

It is therefore an essential object of the present invention to provide for a filleting apparatus, by which the described disadvantages can be remedied. It is a further object of the invention to secure the cutting of clean fillets which lie in the correct position for further processing.

BRIEF SUMMARY OF THE INVENTION

To meet these objects, according to the present invention there is provided an apparatus comprising belly filleting knives, back filleting knives and severing knives, all of these knives preferably being arranged in pairs. The apparatus also includes tools for cutting the ribs free which tools are preferably arranged in pairs and positioned between the belly and back filleting knives on the one hand and the severing knives on the other hand, as well as respective belly and back guides preferably also arranged in pairs, and extending in the planes of the belly and back filleting knives and behind these. The tools for cutting the ribs free include a scraper tool comprising a respective scraper knife arranged on both sides of the belly guides and back guides, starting beside these in a tip with a cutting edge divergent in wedge shape and having a bulge-shaped backing support, which is associated with the cutting edge, forms a gap with this, likewise starts from a tip beside the belly guides and is resiliently deviatable relative to the scraper knife. The scraper tool is so displaceable in height that—shortly before the arrival of the abdominal cavity end of the fish—each scraper knife is movable at least by its tip out of a setting underneath the upper edges of the belly guides into the proximity of the lower edge of the back guides and each backing support is likewise movable at least by its tip out of a setting in the region of the belly guides into the proximity of the upper edges of the same.

The advantages attainable thereby consist particularly in that the fillets are subjected to the scraping forces in a stretched state in consequence of their connection to the skeleton reaching as far as the tail root and still maintained after application of the belly and back filleting cuts, which leads to a clearly smoother cutting surface and correspondingly to an improved yield. Beyond that, through the complete releasing of the fillets taking place by means of the severing cuts only after the scraping process it is attained that these fillets can be deposited in correct position for the automatic further processing.

According to an advantageous embodiment of the invention, each scraper knife may be kinematically so connected with the backing support respectively associated with it that the tips of the scraper knives and backing supports respectively associated with one another display a greater spacing from one another in their raised position than in their basic setting. Thereby, the fillet parts of the belly-sided tail region are prevented from sliding away over the scraper tool during the basic setting of the latter, which would result in the fillet parts entering between the cutting edge of the scraper knife and the backing support and being damaged.

In order to lend the parts of the scraper tool the degrees of freedom necessary for its working motion, in simple manner, each scraper knife and each backing support may expediently be mounted pivotably about a respective axis lying nearly in their respective planes and behind their rearward ends and extending substantially perpendicularly to the belly guides, the spacing of the axis associated with the backing support from the rearward end of the backing support being greater than that between the axis of the scraper knife and the rearward end thereof.

According to a further embodiment of the present invention, each scraper knife at its tip can display a cutting blade, which is upwardly projecting and increasingly rising in the direction of movement of the fish, nearly perpendicular to the plane of the scraper knife and projecting beyond this plane in bulge shape. Thereby, it is assured that the scraper knives can penetrate the flesh bands at the sides of backbone with little cutting pressure when—on the arrival of the abdominal cavity end—they are controllably moved above the ribs or lateral vertebral projections.

In order to attain that the cutting edge of the scraper knife due to its smaller support surface resting on the ribs or vertebral projections always can scrape directly over the latter, according to yet another embodiment of the invention, each scraper knife may be constructed as a scraper bar arranged divergently relative to the longitudinal direction of the belly and back guides.

BRIEF DESCRIPTION OF THE DRAWINGS

Other and further objects of the present invention will be apparent form the following description and claims and are illustrated in the accompanying schematic drawings, which, by way of illustration, show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing form the present invention and the scope of the appended claims.

In the drawings

FIG. 1 shows an axonometric illustration of a fish filleting machine with a scraper tool according to the invention, FIG. 2 shows a partial semi-section through the machine along the section line II—II of FIG. 1, after the tail part of the fish has run up onto the scraper tool in its lowered setting, FIG. 3 shows a partial semi-section through the machine along the section line III—III of FIG. 1, after the arrival of the abdominal cavity end and the scraper tool now controllably moved into its operative position, FIG. 4 shows an enlarged partial view of the tip of a scraper knife, FIG. 5 shows a cross-section through one half of the scraper tool, FIG. 6 shows a side elevational view of the fish filleting machine shown in FIG. 1, but showing the position of a fish therein shortly before the arrival of the push saddle carrying the fish at the tip of the scraper knives, FIG. 7 shows a top view of the filleting apparatus shown in FIG. 1, and FIG. 8 is a cross-sectional view of the working position of the scraper tools taken along the same plane as shown in FIG. 5, but with the tools in the position shown in FIG. 3, and also showing the relationship of the tools to the skeletal portions of a fish.

DETAILED DESCRIPTION OF THE PREFERRED EMBODIMENT

In a filleting machine according to the invention illustrated merely symbolically in FIG. 1, a guide path 1 for the fish is formed by a respective pair of back guides 2 having lower edges 3 and belly guides 4 with upper edges 5 arranged above and below the guide path 1 and leaving a gap 6 between themselves, while another gap not designated by a reference numeral is formed between these lower and upper edges 3 and 5 respectively. With respect to the direction of movement of the fish through the machine indicated by an arrow at the left "entrance" end, a pair of circular belly filleting knives 8 is disposed upstream of the belly guides 4 and in their planes and a pair of back filleting knives 9 upstream of the back guides 2 and likewise in their planes. A pair of circular severing knives 10 for the severing of the fillets from the fish skeleton in their tail region is arranged downstream of the back guides 2. The conveying of the fish takes place through push or thrust saddles 11, which through a conventional endless conveyor, shown schematically in broken lines in FIG. 1, convey the fish saddled up in their abdominal cavity in the aforementioned direction. A scraper tool 12 is mounted between the back filleting knives 9 and the severing knives 10 in the region of the belly guides 4 for the execution of the rib cut. This scraper tool 12 essentially consists of a respective scraper knife 13 arranged on both sides of the guide path 1 beside the belly guides 4 and has a cutting edge 15 diverging in wedge shape from a tip 14 and a bead-shaped or bulge-shaped backing support 16, which likewise emanating from a tip 17 forms a gap 18 (see FIG. 5) with the cutting edge 15. As shown in FIGS. 1 and 7, each scraper knife 13 is disposed with its longitudinal axis parallel to the axis of its associated backing support 16, and each scraper knife 13 and associated backing support 16 diverges from the axis of the belly guides 4 from the tips to the rear ends thereof. The scraper knives 13 as well as the backing supports 16 are mounted to be pivotable about respective axes 21 and 22, lying in their planes behind their rearward ends 19 and 20 and substantially perpendicular to the belly guides 4, and so supported by means of not illustrated abutments that the upper sides of the backing support 16 and scraper knife 13 come to lie underneath the upper edges 5 of the belly guides 4. The spacing of the axis 21 associated with the backing support 16 from the rearward end 20 is greater than that between the axis 22 of the scraper knife 13 and the rearward end 19 thereof. Disposed underneath the one half of the scraper tool 12 is a control device 23 of cam discs 24 and 25, which turn synchronously with the push saddles 11 and act through roller tappets 26 and 27 on the setting of the scraper knife 13 and the backing support 16. The other half of the scraper tool 12 is synchronized in a suitable, not illustrated manner with the controlled half. The scraper knife 13 in the region adjacent its tip 14 comprises a cutting edge 28, which is upwardly projecting to rise in the direction of movement of the fish, perpendicular to the plane of the scraper knife 13 and projecting beyond this plane in bead or bulge shape, as shown in FIGS. 2, 3, and 4.

The function of the apparatus is as follows: A fish 29, opened at least along its abdominal cavity and gutted, is so saddled by its abdominal cavity onto a push saddle 11 conveyed forward by the conveyor that its tail points in the direction of motion of the conveyor. After alignment by not illustrated guide means, the fish is conducted to the belly filleting knives 8 and the back filleting knives 9, which produce two incisions running from the tail root up to the end of the abdominal cavity and from the tail root up to the neck, respectively. On further advance of the fish 27, the back guides 2 and the belly guides 4 enter into the corresponding incisions and take over the guidance of the fish in that they receive the flesh strips containing the back spokes 31 and the belly spokes 32 between them. The lateral vertebral appendages 33 and ribs 34 present in the region of the abdominal cavity are thus conducted into the lateral gap between the belly guides 4 and the back guides 2. The fish 29 is so conducted to the scraper tool 12 for the severing of the fillets 35 from the lateral vertebral projections and ribs, which scraper tool 12 at first persists in a basic setting underneath the upper edges 5 in order to conduct the tail part of the fish 29 over itself, the belly-sided fillet halves in this region being spread out laterally according to FIG. 2. On arrival of the abdominal cavity end, which is in contact with the tip of the push saddle 11, the scraper tool 12 is raised by means of the cam discs 24 and 25 of the control device 23 until the tips 14 of the scraper knives 13 come to lie in the proximity of the lower edges 3 of the back guides 2, while the backing supports 16 together with their tips 17 are disposed into the proximity of the upper edges 5 of the belly guides 4. Each scraper knife 13 by its bulge-shaped or bead-shaped, upwardly projecting cutting edge 28 severs the flesh band 36, maintained in the tail region of the fish, i.e. behind the belly cavity and guided in the gap between the lower and upper edges 3 and 5 respectively and penetrates into the region between the back spokes 31 and the start of the vertebral appendages 33. At the same time, the tips 17 of the backing supports 16 run below the vertebral projections 33 and press these in the further course of the conveying in consequence of the resilience relative to the scraper knives 13 against the latter, whereby their divergent cutting edges 15 can scrape along the upper surface of the vertebral projections 33 and of the ribs 34, as shown in FIGS. 3 and 8. The fillets 35, now still adhering to the skeleton in the tail region laterally of the vertebral column 30 by the flesh bands 36, are subsequently cut free by means of the severing knives 10 through severing of these flesh bands.

Fillet belts, which have not been illustrated and can be arranged laterally of the belly guides 4, take over the fillets and for example feed them directly to a skinning machine.

The embodiments of the invention in which an exclusive property or privilege is claimed are defined as follows:

1. Apparatus for the severing of the fillets from the skeleton of fish, said apparatus comprising
means for conveying a fish with tail forwards along a guide path,
belly filleting means and back filleting means located downstream of said guide path, and fillet severing means located downstream of said guide path,
guide means for guiding said fish from said belly and back filleting means to said fillet severing means, and comprising spaced belly guide members and spaced back guide members aligned with said belly guide members and located thereabove, with the lower edges of said back guide members being spaced above the upper edges of said belly guide members to provide a space therebetween, said guide means being located in the planes of said belly filleting means and back filleting means and extending downstream thereof,
and tool means for cutting free the ribs of said fish, located downstream of said belly and back filleting means and upstream of said severing means,
wherein said tool means comprises respective scraper knives arranged on opposite sides of said guide means, a backing support member associated with each of said scraper knives, and drive means for moving said scraper knives and backing support members selectively between a lowered position and a raised position,
each scraper knife and backing support member having a tip portion located proximate to the outer surface of said guide means, said scraper knife having an elongated body formed with a cutting edge along one side thereof, said cutting edge diverging angularly outward from said tip toward the opposite end thereof, the tip of each backing support member being bulge-shaped and being spaced from the cutting edge of said scraper knife to form a gap therebetween,
said drive means being operable, in response to movement of the abdominal cavity of a fish into proximity to said tool means, to move each scraper knife from its lowered position, in which its tip portion is located below the upper edge of said belly guide member, to its raised position in which its tip portion is located substantially at the level of the lower edge of said back guide member, and also to move each backing support member from its lowered position, in which its tip is located adjacent to an intermediate portion of said belly guide member, to its raised position in which its tip portion is located at the level of the upper edge of said belly guide member.

2. Apparatus according to claim 1 in which each scraper knife is mounted for movement about a pivotal axis and the associated backing support member is pivotally mounted about a remote pivotal axis, said pivotal axes being so located relative to each other that in their raised positions the scraper knife and backing support member are spaced at a greater distance from each other than in their lowered positions.

3. Apparatus according to claim 1 in which each scraper knife is pivotally mounted about a respective axis lying substantially in the plane of said scraper knife and rearwardly of its rear end opposite said tip portion, with said axis extending perpendicularly to said belly guide member, and in which the associated backing support member is pivotally mounted about a separate axis lying substantially in the plane of said backing support member and rearwardly of its rear end opposite said tip portion, with said axis extending perpendicularly to said belly guide member, the spacing of the backing support member axis from the rear end of said backing support member being greater than the spacing of said scraper knife axis from the rear end of said scraper knife.

4. Apparatus as claimed in any one of claims 1 to 3, wherein each scraper knife has an upwardly projecting cutting blade at its tip portion, said cutting blade having a forward cutting edge extending angularly upward in the direction of the travel of said fish, perpendicular to the plane of said scraper knife and projecting beyond said plane in a bulge shape.

5. Apparatus according to claim 4 in which each scraper knife is formed as a scraper bar mounted to diverge outwardly from the longitudinal axes of said belly guide members and said back guide members.

* * * * *